US012366753B2

(12) United States Patent
Chelf et al.

(10) Patent No.: US 12,366,753 B2
(45) Date of Patent: Jul. 22, 2025

(54) POWER FOR A WEARABLE E-READER

(71) Applicant: Sindarin, Inc., San Francisco, CA (US)

(72) Inventors: Benjamin Eli Nelson Chelf, San Francisco, CA (US); John Aaron Boiles, Albany, CA (US); Nicholas Cory Johnson, Austin, TX (US); Nicholas Grant Lewis, Sparks, NV (US)

(73) Assignee: Sindarin, Inc., San Francisco, CA (US)

( * ) Notice: Subject to any disclaimer, the term of this patent is extended or adjusted under 35 U.S.C. 154(b) by 501 days.

(21) Appl. No.: 17/888,036

(22) Filed: Aug. 15, 2022

(65) Prior Publication Data

US 2023/0333392 A1    Oct. 19, 2023

Related U.S. Application Data

(60) Provisional application No. 63/332,396, filed on Apr. 19, 2022.

(51) Int. Cl.
| | |
|---|---|
| *G02B 27/01* | (2006.01) |
| *F21V 8/00* | (2006.01) |
| *G02B 25/00* | (2006.01) |
| *G02C 5/20* | (2006.01) |
| *G02C 11/00* | (2006.01) |
| *G06F 1/16* | (2006.01) |

(52) U.S. Cl.
CPC ....... *G02B 27/0149* (2013.01); *G02B 6/0045* (2013.01); *G02B 6/0055* (2013.01); *G02B 6/0073* (2013.01); *G02B 25/004* (2013.01); *G02B 27/0172* (2013.01); *G02B 27/0176* (2013.01); *G02B 27/0179* (2013.01); *G02C 5/20* (2013.01); *G02C 11/10* (2013.01); *G06F 1/163* (2013.01); *G02B 2027/0154* (2013.01); *G02B 2027/0178* (2013.01)

(58) Field of Classification Search
CPC ............ G02B 27/0149; G02B 27/0172; G02B 27/0176; G02B 27/0179; G02B 6/0045; G02B 6/0055; G02B 6/0073; G02B 6/0018; G02B 6/0031; G02B 25/004; G02B 2027/0154; G02B 2027/0178; G02C 5/20; G02C 11/10; G06F 1/163; G06F 15/0291
USPC ......................................................... 359/630
See application file for complete search history.

(56) References Cited

U.S. PATENT DOCUMENTS

| | | | |
|---|---|---|---|
| 6,005,720 | A | 12/1999 | Watters |
| 6,563,648 | B2 | 5/2003 | Gleckman |
| 9,837,852 | B1 | 12/2017 | Barnes |
| 9,927,650 | B1 | 3/2018 | Almanza-Workman |
| 11,480,800 | B1 | 10/2022 | Schuck |
| 11,506,912 | B2 | 11/2022 | Osterhout |
| 2008/0219025 | A1 | 9/2008 | Spitzer |
| 2009/0039349 | A1 | 2/2009 | Honda |

(Continued)

FOREIGN PATENT DOCUMENTS

| | | |
|---|---|---|
| CN | 210182038 | 3/2020 |
| WO | 2022184062 | 9/2022 |

*Primary Examiner* — William R Alexander
(74) *Attorney, Agent, or Firm* — Van Pelt, Yi & James LLP

(57) ABSTRACT

The present application discloses a system for powering a wearable e-reader. The system includes two optical units. The two optical units are part of the system that is wearable. The optical units comprise a front lit display. The system further includes a battery. The battery powers the two optical units.

18 Claims, 17 Drawing Sheets

(56) References Cited

U.S. PATENT DOCUMENTS

| | | | |
|---|---|---|---|
| 2012/0057133 A1* | 3/2012 | Robinson | G03B 35/26 |
| | | | 359/465 |
| 2012/0169990 A1* | 7/2012 | Burnstein | A43B 3/246 |
| | | | 351/115 |
| 2012/0212414 A1 | 8/2012 | Osterhout | |
| 2013/0009059 A1* | 1/2013 | Caruso | G02C 7/101 |
| | | | 351/44 |
| 2013/0063969 A1 | 3/2013 | Neugebauer | |
| 2013/0222736 A1 | 8/2013 | Qi | |
| 2015/0187330 A1 | 7/2015 | Yang | |
| 2015/0323792 A1 | 11/2015 | Kinoshita | |
| 2016/0005231 A1 | 1/2016 | Yamaga | |
| 2016/0189406 A1 | 6/2016 | Landau | |
| 2016/0266878 A1 | 9/2016 | Mankovskii | |
| 2019/0250400 A1* | 8/2019 | Ricks | G02B 27/10 |
| 2019/0285894 A1 | 9/2019 | Tian | |
| 2019/0353910 A1* | 11/2019 | Gwalani | G02B 27/0172 |
| 2020/0142222 A1* | 5/2020 | Belli | G02C 11/06 |
| 2020/0174558 A1* | 6/2020 | Gui | G02C 11/10 |
| 2020/0310137 A1 | 10/2020 | Lan | |
| 2020/0348528 A1 | 11/2020 | Jamali | |
| 2021/0173213 A1* | 6/2021 | Ricks | G02B 7/1805 |
| 2021/0215940 A1 | 7/2021 | Freese | |
| 2021/0223549 A1 | 7/2021 | Maimone | |
| 2021/0294104 A1 | 9/2021 | Hossain | |
| 2022/0099966 A1* | 3/2022 | Khaderi | G02B 27/0093 |
| 2022/0200318 A1 | 6/2022 | Yoon | |
| 2022/0269091 A1* | 8/2022 | Nicholson | G06F 1/1681 |
| 2023/0176371 A1* | 6/2023 | Lee | H04W 4/80 |
| | | | 345/8 |

* cited by examiner

1000

1300

1400

POWER FOR A WEARABLE E-READER

CROSS REFERENCE TO OTHER APPLICATIONS

This application claims priority to U.S. Provisional Patent Application No. 63/332,396 entitled A WEARABLE E-READER filed Apr. 19, 2022, which is incorporated herein by reference for all purposes.

BACKGROUND OF THE INVENTION

Typical e-reading devices are handheld, have large screens to make them legible, and project lots of light towards the user. These characteristics pose several problems. Being handheld can cause neck or arm strain depending on the position a user holds the e-reading device. In addition, for users with shaky hands, the e-reader may not be readable. Also, the large screens are problematic because they increase power consumption for the devices requiring heavy batteries, which both cause high weight for the device. And last, the light projected towards the user can cause eye strain and disrupt sleep.

BRIEF DESCRIPTION OF THE DRAWINGS

Various embodiments of the invention are disclosed in the following detailed description and the accompanying drawings.

DETAILED DESCRIPTION

Figure 1:
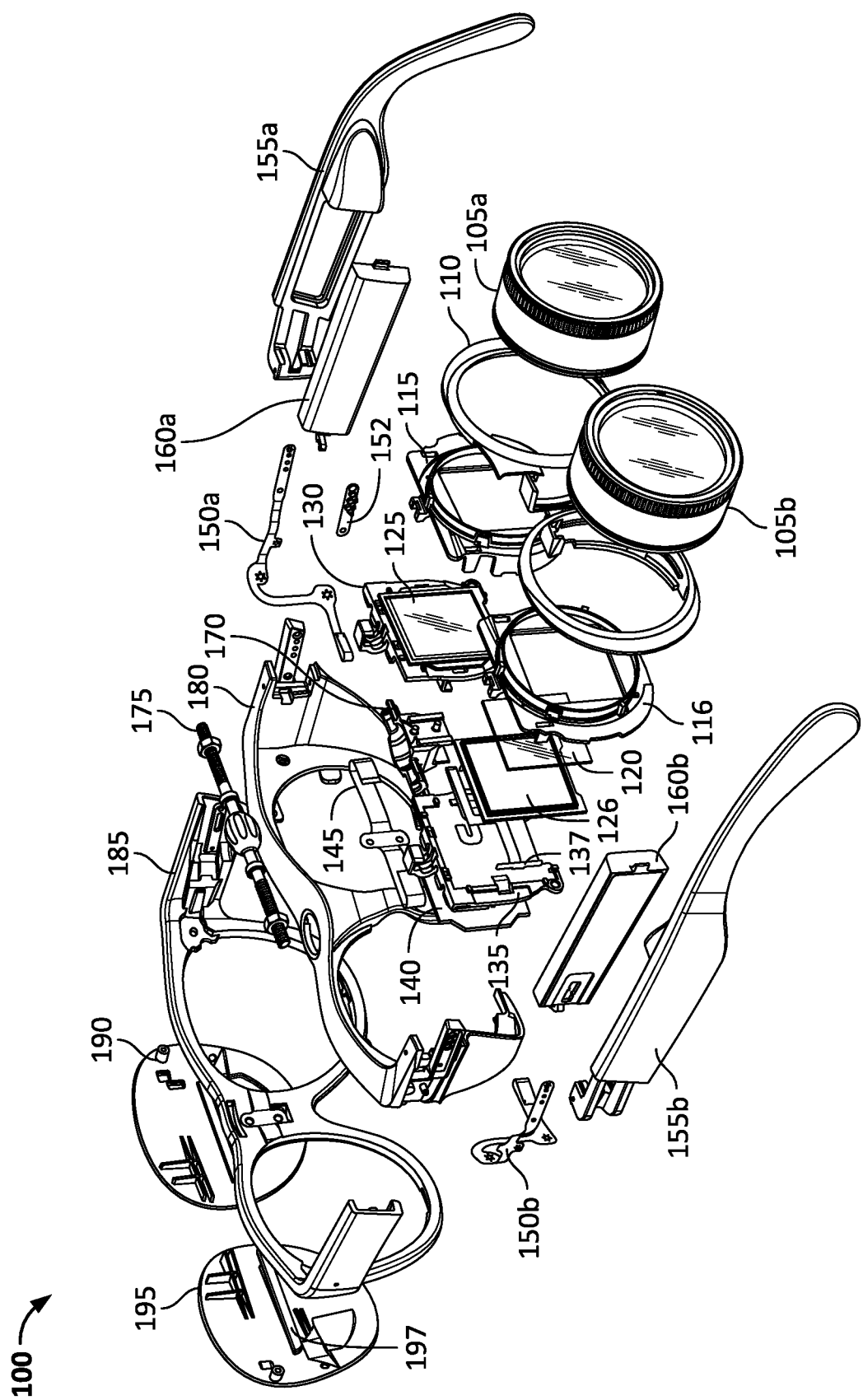
FIG. 1 is an exploded view of wearable e-reader according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, content corresponds to text or images. The content can further correspond to a video. In some embodiments, the content is comprised in a file that is stored on a memory.

As used herein, electronic ink (e-ink) corresponds to electronic paper or other display devices that mimic the appearance of physical ink on paper. An e-ink display reflects ambient light. The warm light reflected off e-ink is generally better for reading than backlight solutions especially those that emit blue light.

Various embodiments disclose a wearable electronic reader (e.g., e-reader). In some embodiments, the wearable e-reader comprises a front-lit display. As an example, the display is an e-ink display. The wearable e-reader enables hands-free reading in various postures, etc.

Related art wearable systems that display content are generally virtual reality (VR) or augmented reality (AR) systems. VR and AR systems include high-resolution displays, and associated optics to maximize the size of the field of view. Because of the high refresh rate display requirements for VR and AR systems, the VR and AR systems typically use backlit or emissive display technologies such as backlit LCD or OLED. These displays shine light directly into the user's eyes which can cause eye strain. Further, most backlight displays include blue light, which is generally believed to negatively affect a user's sleep. In some embodiments, the field of view is set by the optics. In some embodiments, a wearable e-reader has a narrow field of view to enable comfortable viewing for a user.

Related art e-readers may include front light displays. However, such related art e-readers are generally hand-held units and thus not ideal for promoting good user posture and generally inconvenient for reading/viewing content, such as for prolonged use.

According to various embodiments, a system and device for displaying content is disclosed. The system comprises an optical unit. The optical unit is wearable. In some embodiments, the optical unit comprises a magnifying lens, a polarizer, a front light, and a display, wherein the front light illuminates the display from the front of the display to be observable by a user via the magnifying lens. In some embodiments, the display is controlled to display content.

According to various embodiments, a system and device for displaying content is disclosed. The system comprises an optical unit. The optical unit is wearable. In some embodiments, the optical unit comprises a magnifying lens, a front light, and a display. The front light illuminates the display from the front of the display to be observable by a user via the magnifying lens. In various embodiments, the magnifying lens comprises a Fresnel lens, a pancake lens, a microlens array, or any other appropriate lens. In some embodiments, the display is controlled to display content.

According to various embodiments, a system and device for displaying content is disclosed. The system comprises an optical unit. The optical unit includes an e-ink screen, a circular polarizer, and one or more pancake lenses.

According to various embodiments, an optical unit is disclosed. The optical unit comprises an e-ink display, a pancake lens, and a polycarbonate light guide. The e-ink display may correspond to a e-paper display. As an example, the e-ink display may be about a 1.3" e-ink display.

According to various embodiments, a wearable backlight e-reader is disclosed. The wearable backlight e-reader comprises a circuit board, a light source (e.g., a light emitting diode (LED)), a liquid crystal display (LCD) (e.g., that is controlled to control content viewable on the e-reader display), a pancake lens, and a polarizer (e.g., a circular polarizer).

Various embodiments improve the user experience for reading/consuming content, such as books, magazines, newspapers, etc. For example, various embodiments provide an e-reader in a wearable form factor to enhance user experience and to enable users to consume content in more comfortable conditions (e.g., posture, eye strain, etc.). Further, various embodiments improve the cost and/or power effectiveness for wearable systems. For example, the high-resolution display requirements and high-processing requirements for VR and AR systems generally lead to increased component costs and increased power consumption compared to the system described below.

FIG. 1 is an exploded view of wearable e-reader according to various embodiments of the present application.

According to various embodiments, wearable e-reader 100 comprises an optical unit. The optical unit comprises a magnifying lens, a polarizer, a light, and a display. Wearable e-reader 100 uses the optical unit to provide content to a user during use. In the example illustrated in FIG. 1, the optical unit comprises lenses (e.g., pancake lenses 105*a* and 105*b*), a polarizer (not shown), light guide 120, and displays (e.g., e-ink displays 125 and 126).

In some embodiments, the lenses comprised in wearable e-reader 100 correspond to a small/compact lens assembly such as pancake lenses 105*a* and 105*b*. The lenses may comprise a focus adjustment mechanism. In the example illustrated in FIG. 1, pancake lenses 105*a* and 105*b* may be adjusted by rotation of the knurled ring closest to the user eye. As an example, the lenses may be the components of the optical unit that are closest to the user eye. Although the example illustrates pancake lenses 105*a* and 105*b*, various embodiments implement different lens technologies. For example, various embodiments implement other light field lens technology. In some embodiments, a focal point/distance of a lens is proportional or roughly equivalent to the width of the lens.

According to various embodiments, the diameter of the lenses is determined based at least in part on a form factor of the display. In some embodiments, the diameter of a lens (e.g., each lens) is at least the size of the length of the diagonal of the corresponding display comprised in wearable e-reader 100. In some embodiments, the diameter of the lens (e.g., pancake lenses 105*a* or 105*b*) is selected to be small enough to allow for interpupillary distance adjustment (e.g., adjustment of the interpupillary distance between the corresponding lenses). In some embodiments, the diameter of the lens is selected to be sufficiently large enough to obtain an entire view of the display. In some embodiments, the diameter of the lens is based at least in part (i) the interpupillary distance adjustment range for the lenses being between 58 mm-72 mm for a total range of 14 mm, and (ii) the size of the display (e.g., such that the diameter of the lens is at least equal to the length of the diagonal of the display).

In the example shown, wearable e-reader 100 comprises mounting structures 115 and 116. In some embodiments, mounting structures 115 and 116 are mounting structures for pancake lenses 105*a* and 105*b*. In some embodiments, pancake lenses 105*a* and 105*b* are mounted to mounting structures 115 and 116 using an adhesive. In some embodiments, mounting structures 115 and 116 comprise an alignment mechanism to maintain alignment between pancake lenses 105*a* and 105*b* and mounting structures 115 and 116. For example, the alignment mechanism may include a tab/slot interface. Mounting structures 115 and 116 may include a tab that slides into a slot on pancake lenses 105*a* and 105*b*. Conversely, pancake lenses 105*a* and 105*b* may comprise tabs that slide into corresponding slots in mounting structures 115 and 116.

In some embodiments, the polarizer is disposed between the lenses and light guide 120. In the example shown, the polarizer is bonded to pancake lenses 105*a* and 105*b*, such as with an adhesive (e.g., an optically clear adhesive). In some embodiments, the adhesive is an index matching adhesive. In some embodiments, the polarizer is bounded to, or mounted on, light guide 120. The polarizer changes polarization of light traveling from the screen to the user's eyes to ensure that the light entering the lenses has the appropriate polarization to operate with the lens (e.g., a pancake lens). In some embodiments, the lens does not require a polarization change and in that case a polarizer may not be needed in the optic train. As an example, the polarizer comprises a circular polarizer. Circular polarizers may be used if the lens corresponds to a pancake lens. However, in other implementations, different types of polarizers may be used. According to various embodiments, the polarizer is disposed at another appropriate location between an eye and the pancake lens. In some embodiments the polarizer may be combined with the light guide into a single piece, for example by applying a polarization film onto the light guide.

In some embodiments, light guide 120 is disposed between the lenses and the displays. In the example shown, light guide 120 is disposed between inner molding 110 and e-ink display 125. According to various embodiments, light guide 120 is configured to direct light from a light source (e.g., a front light) to display. As an example, light guide 120 can be configured to permit light to be side injected. As another example, light guide 120 can be configured to permit light to be injected to a side/surface closest to the display (e.g., a side of light guide 120 opposite to a side on which the polarizer is disposed).

According to various embodiments, light guide 120 comprises polycarbonate, glass, acrylic, Polyethylene terephthalate glycol (PETG), clear glue, or any other appropriate material. As an example, polycarbonate can be machined/milled. Accordingly, use of polycarbonate in light guide 120 enables a surface/edge of light guide 120 to be shaped to promote light injection. As an example, a wedge on respective top corners (e.g., corners at the edge of a surface of light guide 120 closes to the polarizer) can be milled to promote light to be appropriately reflected through light guide 120 to a display and hence to a user eye. In some embodiments, a piece at the top corners/edges of light guide 120 is ground at a 45 degree angle, and a mirror is disposed on the resulting angled surface.

According to various embodiments, light guide 120 comprises clear acrylic or polycarbonate rectangular volume. Light guide 120 can be configured to permit injection of light from a predetermined angle. In some embodiments, in the case of injection of light from a surface behind the display (e.g., such that light is directed to a surface on the display side of light guide 120), a right-angled mirror is disposed on the top edges of light guide 120 (e.g., to appropriate reflect light to the display).

According to various embodiments, light guide 120 is mounted to the displays (e.g., e-ink display 125). Light guide 120 may be optically transparent (e.g., clear) and may be mounted to the displays using an adhesive. In some embodiments, the adhesive bonding the light guide(s) and the display(s) is an index matching adhesive.

In some embodiments, light guide 120 has a polarizer coating disposed on at least one surface (e.g., a surface facing the lenses, etc.).

In the example shown, the displays of wearable e-reader 100 are e-ink displays (e.g., e-ink display 125 and/or e-ink display 126). According to various embodiments, wearable e-reader 100 can implement various display technologies. For example, rather than using e-ink displays, wearable e-reader can implement a liquid crystal display (LCD), a memory LCD technology, etc. Use of an LCD display may enable the wearable e-reader 100 to be see-through. E-ink displays are generally not see-through and external/ambient light is not permitted into the field of view.

In some embodiments, the displays comprise relatively low-resolution displays. Although the displays may be relatively low-resolution, the displays provide a sufficiently fine resolution for purposes of consuming text and images. For example, the displays have a resolution equal to or less than 500 pixels per inch (ppi). As another example, the displays have a resolution equal to about 300 ppi. As another example, the displays have a resolution of less than 300 ppi. In some embodiments, the pixel counts of each of the displays is 256×256. In some embodiments, the pixel counts of each of the displays is 800×600.

The use of the system as a wearable e-reader allows for a relatively small form factor display. In some embodiments, a display has physical dimension of 1.065" in the x-y plane (e.g., along the diagonal of the display). In some embodiments, the display has a physical dimension of 1.33" in the x-y plane.

According to various embodiments, wearable e-reader 100 comprises one or more light sources (e.g., front light(s), etc.). Various types of light sources can be used, such as a light emitting diode(s) (LED). The light sources emit light that is injected to (e.g., projected in to) light guide 120. Various embodiments may implement different arrangements of the light source in relation to light guide 120 and different parts of light guide 120. For example, in some implementations, the front light is injected to light guide 120 from one or more sides of light guide 120. As another example, in some implementations, the front light is injected to light guide 120 is injected to a surface of light guide 120 opposite to a side at which the lens(es) are disposed (e.g., the light is injected from the display side of light guide 120).

According to various embodiment, the optical unit is mounted to a circuit board (e.g., a printed circuit board (PCB)). In the example shown, wearable e-reader 100 comprises circuit board 140. In some embodiments, wearable e-reader 100 comprises two circuit boards to activate a display for each eye of a user.

According to various embodiments, the optical units are configured to be positioned relative to a user's eye. For example, wearable e-reader 100 has the optical units configured to be angled out by about 5 degrees (e.g., angled away from a normal of the plane of the e-reader glasses frame lens/covers (e.g., lens/covers 195 and 190) and away from the centerline of the glasses frame so that the eyes can angle toward the nose in a natural reading angle when viewing the displays). In the example shown, wearable e-reader 100 comprises angled backing 130 and 135. The optical units are attached (either directly or indirectly such as via a circuit board) to angled backing 130 and 135. In some embodiments, the angled backing 130 and 135 are adjustable to adjust the angle of the optical units (e.g., the lenses). For example, angled backing 130 and 135 are configured to provide adjustment of alignment of the optical units between 0 degrees and 10 degrees. As another example, angled backing 130 and 135 are configured to provide adjustment of alignment of the optical units between 0 degrees and 5 degrees. In some embodiments, the angled backing 130 and 135 are configured to provide an alignment with a 4-degree offset. In some embodiments, angled backing 130 and 135 are configured to adjust the different optical units by a same amount. In some embodiments, a surface of e-ink displays 125 and 126 are not parallel with a side of angled backing 130 and 135 opposite a side to which e-ink displays 126 and 126 are mounted. Humans are generally acclimated to focusing on objects at a close distance. For example, human eyes orient to a set of images at an angle offset to ensure convergence of the eyes to replicate viewing at near distances. In related art, VR and AR systems generally configure the displays/optical units to ensure that the user is looking to infinity. Accordingly, related art VR and AR systems do not enable adjustment (e.g., comprise an adjustment mechanism) of an angle offset of the optical units.

In some embodiments, as an alternative to enabling adjustment of an offset of the optical units, or in addition to such adjustment, wearable e-reader 100 offsets the images to achieve the same image tilt as is natural for being viewed by human eyes.

In some embodiments, the optical units (e.g., e-ink displays 125 and 126) are mounted to angled backing 130 and 135, and the circuit board(s) are comprised on (e.g., mounted to) an opposite side of angled backing 130 and 135. For example, in the example shown, e-ink display 126 is mounted to angled backing 135, and circuit board 140 is disposed on an opposite side of angled backing 135. A circuit board (e.g., circuit board 140) can be mounted (e.g., via adhesive, etc.) to angled backing 135. In some embodiments, e-ink display 126 is mounted to circuit board 140, which in turn is mounted to angled backing 135.

According to various embodiments, wearable e-reader 100 comprises a control system. As an example, the one or more modules include a processor(s). The control system is configured to store/manage content, provide a user interface, communicate with another device or network (e.g., via a wired connection or a wireless connection such as Bluetooth®, Wi-Fi, cellular, etc.), control the displays (e.g., provide power to the displays, provide content to be displayed by displays, etc.), etc. According to various embodiments, wearable e-reader 100 comprises one or more connectors between components such as a connector that connects the control system to a power source, a sensor (e.g., an ambient light sensor), one or more lights, a display, etc. In some embodiments, the one or more connectors comprises one or more flex cables (e.g., flex cables 137, 145, 150a, 150b). For example, in the example shown, wearable e-reader 100 comprises flex cable 145 that connects e-ink displays 125 and 126 to one or more circuit boards (e.g., circuit board 140) or otherwise interconnects the circuit boards for the left and right eyes. As another example, in the example shown, wearable e-reader 100 comprises flex cables 150a and 15b that respectively connect the circuit board(s) to power sources (e.g., batteries 160a and 160b). Flex cable 145 can comprise one or more mechanisms for stress relief. In the example shown, flex cable 145 comprises two holes, which are used for fastening the cable to the frame and to provide stress relief.

In some embodiments, the circuit board (e.g., circuit board 140) comprises the one or more control modules. The circuit board(s) also provide(s) (e.g., connects) power to the one or more control modules and displays.

Wearable e-readers according to various embodiments are significantly more power efficient than related art VR and AR systems. For example, e-ink displays 125 and 126 are more power efficient than displays in VR and AR systems. E-ink displays 125 and 126 do not require power driving to maintain an image. Accordingly, as a reader is reading a page of a content (e.g., a page of book), wearable e-reader 100 is not required to drive power to the displays. Wearable e-reader 100 can be configured to obtain a user input, or detect a user interaction, in connection with determining to change the content displayed on the displays (e.g., to turn the page of a book). In response to determining that the content displayed on the displays is to be changed, wearable e-reader 100 drives power to the displays to change the content.

According to various embodiments, wearable e-reader 100 comprises one or more batteries (e.g., batteries 160a and 160b) to provide power. In some embodiments, the batteries comprise 500 mAH batteries, or less. According to various embodiments, a power draw of wearable e-reader 100 is 15 mA or less at 4V. In some embodiments, batteries 160a and 160b are permanently housed in wearable e-reader 100, or alternatively, removably housed. In the example shown, batteries 160a and 160b are mounted to arms 155a and 155b.

In some embodiments, batteries 160a and 160b are rechargeable. In some embodiments, wearable e-reader 100 includes contact points that enable recharging when a charging current is provided to the contact points (e.g., by placing wearable e-reader 100 onto a stand or holder with contacts to put in touch with the contact points). In some embodiments, wearable e-reader 100 comprises one or more solar panels. The one or more solar panels may be disposed on the front of the glasses, on a side of the glasses, and/or on one or more of the arms on the glasses, etc. Because of the low power consumption for operation of wearable e-reader 100, the batteries of wearable e-reader 100 may be sufficiently charged via ambient light even though indoor light is ten to one hundred times less powerful as compared to the sun or light outdoors.

Wearable e-reader 100 comprises arms 155a and 155b, which rest on a user's ears during use. As discussed above, arms 155a and 155b may comprise one or more batteries that provide power to the system. In some embodiments, arms 155a and 155b comprise a switch for powering on/off wearable e-reader 100. In the example illustrated in FIG. 1, wearable e-reader comprises one or contacts (e.g., contact 152) between arms 155a and 155b and the control system (e.g., circuit board 140). In some embodiments, wearable e-reader 100 is configured to have a physical connect/disconnect mechanism based on a positioning of arms 155a and 155b, such as based on whether arms 155a and 155b are open or closed. As an example, if arms 155a and 155b are in an open position (e.g., to be worn by a user), a physical connection is made between an electrical contact on arms 155a and 155b and an electrical contact connected to the circuit board(s). For example, contact 152 electrically connects battery 160a with a connector (e.g., flex cable 150a), which in turn is electrically connected to power circuits on the circuit board(s) for the display. In some embodiments, wearable e-reader 100 is configured to have a magnetic-based mechanism to control the system (e.g., circuit board 140). This magnetic mechanism may, for example, be comprised of a hall-effect switch, digital magnetometer, or a magnetoresistive sensor. In some embodiments, the mechanism to control the system comprises a sensor to detecting touch to skin on the ears or nose as a method of powering on.

In some embodiments, an interpupillary distance (IPD) between lenses is adjustable. In the example shown in FIG. 1, wearable e-reader 100 comprises holding structure 170 that is configured to support adjustment screw 175 that adjusts the interpupillary distance between e-ink displays 125 and 126, and/or pancake lenses 105a and 105b. In some embodiments, adjustment screw 175 comprises a left-handed thread and a right-handed thread for individual adjustment the corresponding locations of the respective lenses/displays. Adjustment of interpupillary distance enables wearable e-readers 100 to be comfortably used by a wider set of users. For example, a person's nose is not always in the center of their face (e.g., centered between the person's ears), or the pupillary distance between each eye may be asymmetrical. In some embodiments, the mechanism for adjusting the interpupillary distance is configured to be between 58 mm-72 mm for a total range of 14 mm.

In some embodiments, wearable e-reader 100 comprises inner molding 110. As illustrated in FIG. 1, inner molding 110 can be disposed between pancake lenses 105a and 105b and the inner moldings (e.g., inner molding 110 that provides light-shielding). Inner molding 110 can comprise a rubber. Inner molding 110 is configured to prevent moisture from reaching e-ink displays 125 and 126.

Wearable e-reader 100 comprises one or more framing structures that provide support for the optical units. In the example shown, wearable e-reader 100 comprises framing structures 180, 185, and inner molding 110. Framing structures 180, 185, and inner molding 110 provide support for pancake lenses 105a and 105b, the light source, e-ink displays 125 and 126, and the circuit board(s) (e.g., circuit board 140).

Wearable e-reader 100 can be configured to be light-shielded. In the example shown, wearable e-reader 100 comprises inner moldings (e.g., inner molding 110). According to various embodiments, inner molding 110 is configured to block light or view into the inner structure of the e-reader. For example, inner molding 110 is disposed to prevent ambient light (or otherwise external light) from entering the field of view of wearable e-reader 100, which would cause diminished viewability of content being displayed by the displays.

According to various embodiments, wearable e-reader 100 comprises covers 190 and 195. Covers 190 and 195 provide further light-shielding. In some embodiments, if wearable e-reader 100 is a see-through design, then covers 190 and 195 permit light through. In the example shown, wearable e-reader 100 is light-shielding and covers 190 and 195 are opaque. Covers 190 and 195 may comprise one or more rails (e.g., rail 197) configured to guide motion of adjustable angled backs 130 and 135 that can be moved such as in connection with adjusting the interpupillary distance(s) (e.g., by turning knob at center of adjustment screw 175).

According to various embodiments, the control system of wearable e-reader 100 controls content being displayed on the displays. The control system controls operation of wearable e-reader 100 (e.g., a processor/user interface of the system) based on user input or based on detection of a user interaction. For example, wearable e-reader 100 may comprise one or more sensors that detect eye movement of users (e.g., eye-tracking sensor(s)) to enable control system to control operation of the system based on eye motion commands input by the user. As another example, wearable e-reader 100 may comprise one or more sensors that detect movement or placement of a hand, and the controls system uses such movement/placement of the hand to control operation of the system. In some embodiments, the control system controls content displayed on the displays based at least in part on the user input and/or user interaction. For example, the control system controls to navigate the content (e.g., turn pages to advance a book, or to turn to a previous page, etc.). In various embodiments, the control system is used to control e-reader lighting, select content (e.g., a book title, an article, a magazine, etc.), delete content, adjust fonts, or any other appropriate control for an e-reader. In some embodiments, control system receives indications from one or more buttons mounted on glasses frame (e.g., a button for turn page forward, a button for turn page back, a button for menu up, a button for menu down, a button for select, a button for on/off, etc.).

In some embodiments, wearable e-reader 100 comprises one or more light sensors such as an ambient light sensor(s). In some embodiments, the control system controls the system based at least in part on the detected light. For example, the control system adjusts the power provided to the light sources (e.g., adjusts light emitted by the light sources) based on the level/extent of ambient or external light.

In some embodiments, wearable e-reader 100 is connected to a dongle or other external peripheral with which a user inputs a command (e.g., a user input) to wearable e-reader 100. For example, wearable e-reader 100 may be wirelessly connected to a hand-held wand that that is used to control operation of the system (e.g., to turn pages, to load content, etc.). In various embodiments, the dongle or other external peripheral communicate with wearable e-reader 100 (e.g., a circuit board, a controller or processor on the circuit board, etc. via a wired connector, a wireless connection (e.g., Bluetooth, WiFi, infrared (IR), etc.), or any other appropriate communication connection.

Figure 2:
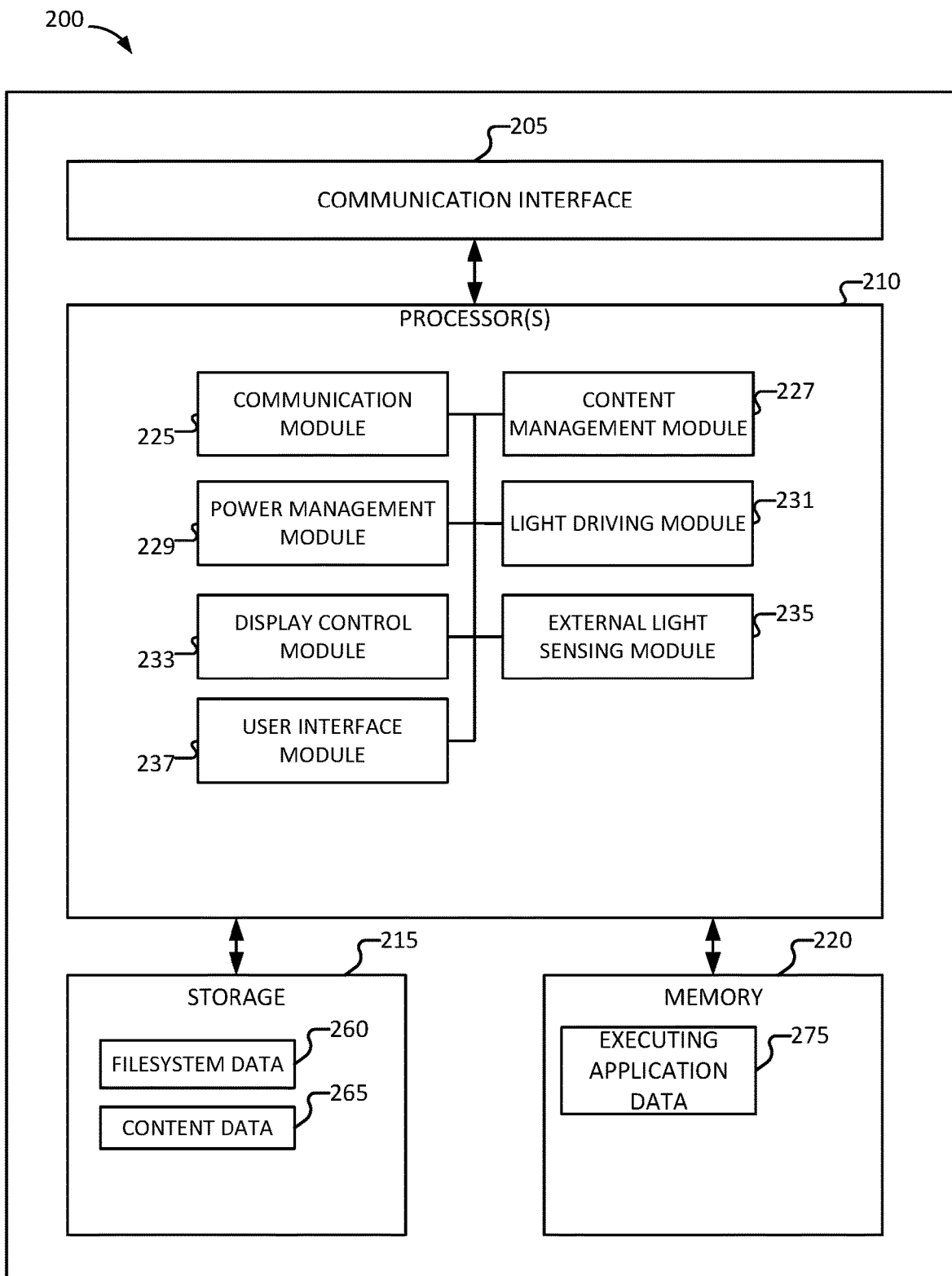
FIG. 2 is a block a diagram of a system according to various embodiments of the present application.

FIG. 2 is a block a diagram of a system according to various embodiments of the present application. In some embodiments, system 200 implements at least part of wearable e-reader 100.

In the example shown, system 200 implements one or more modules in connection with managing and displaying content (e.g., displaying content for a wearable e-reader). System 200 comprises communication interface 205, one or more processors 210, storage 215, and/or memory 220. One or more processors 210 comprises, or implements, one or more of communication module 225, content management module 227, power management module 229, light driving module 231, display control module 233, external light sensing module 235, and/or user interface module 237.

In some embodiments, system 200 comprises communication module 225. System 200 uses communication module 225 to communicate with various other systems such as peripheral device (e.g., a hand-held wand), a smartphone, a tablet, a laptop, etc. For example, communication module 225 provides to communication interface 205 information that is to be communicated. As another example, communication interface 205 provides to communication module 225 information received by system 200. Communication module 225 is configured to receive user input from the other system, or to download content to local storage (e.g., storage 215) of system 200.

In some embodiments, system 200 comprises content management module 227. System 200 uses content management module 227 to manage content to be downloaded/stored on system 200. For example, content management module 227 interfaces with a web service or application running on a peripheral to navigate a library of content or to otherwise obtain (e.g., download, receive via push, etc.) content.

In some embodiments, system 200 comprises power management module 229. System 200 uses power management module 229 to manage power distributed to different components of system 200. For example, power management module 229 is used to drive the displays. Power management module 229 can provide power to displays at least when content to be displayed thereon is changed. In some embodiments, power management module 229 ceases providing power to the displays when content is not being changed. As another example, power management module 229 is used to provide power to the light source(s). Power management module 229 can adjust the amount of power provided to the light source(s) based on a level of ambient/external light.

In some embodiments, system 200 comprises light driving module 231. System 200 uses light driving module 231 to control a light source. In some embodiments, light driving module 231 controls the light source based on an input from power management module 229, such as an indication of an extent of light to be emitted (e.g., a brightness) based on ambient/external light.

In some embodiments, system 200 comprises display control module 233. System 200 uses display control module 233 to control content to be displayed on the displays of the wearable e-reader. Display control module 233 provides content to the displays for display. In some embodiments, display control module 233 controls content to be displayed on the displays (or provided to the displays) based on a received user input or a detected user interaction, such as a command to turn a page or otherwise change content being displayed.

In some embodiments, system 200 comprises external light sensing module 235. System 200 uses external light sensing module 235 to detect (e.g., receive from a light sensor(s)) an ambient or external light. External light sensing module 235 determines a level/extent of the ambient or external light and provides an indication of such information to power management module 229 and/or light driving module 231.

In some embodiments, system 200 comprises user interface module 237. System 200 uses user interface module 237 to configure and provide a user interface to a user. The user interface can be displayed on the displays, such as by content management module 227 and/or display control module 233. User interface module 237 can configure a user interface that provides menus to navigate content or user settings/preferences. A user may interact with the user interface via a peripheral, a button, or other sensor on the system (e.g., a button on the arms of the glasses, an eye-tracking sensor, etc.).

According to various embodiments, storage 215 comprises one or more of filesystem data 260 and/or content data 265. Storage 215 may be a solid-state device (SSD) memory, which is lightweight and/or power-efficient and has a small form factor.

In some embodiments, filesystem data 260 comprises information such as user settings, user information, account information, network settings, communication settings, user preferences (e.g., light brightness, font size, etc.).

In some embodiments, content data 265 comprises content downloaded to system 200. For example, content comprises a catalog of one or more books, articles, magazines, newspapers, etc.

According to various embodiments, memory 220 comprises executing application data 275. Executing application data 275 comprises data obtained or used in connection with executing an application such as an application executing in connection with providing content to be read on the displays of the e-reader, or an application executing in connection with obtaining new content, managing content stored on system 200, etc.

Figure 3A:
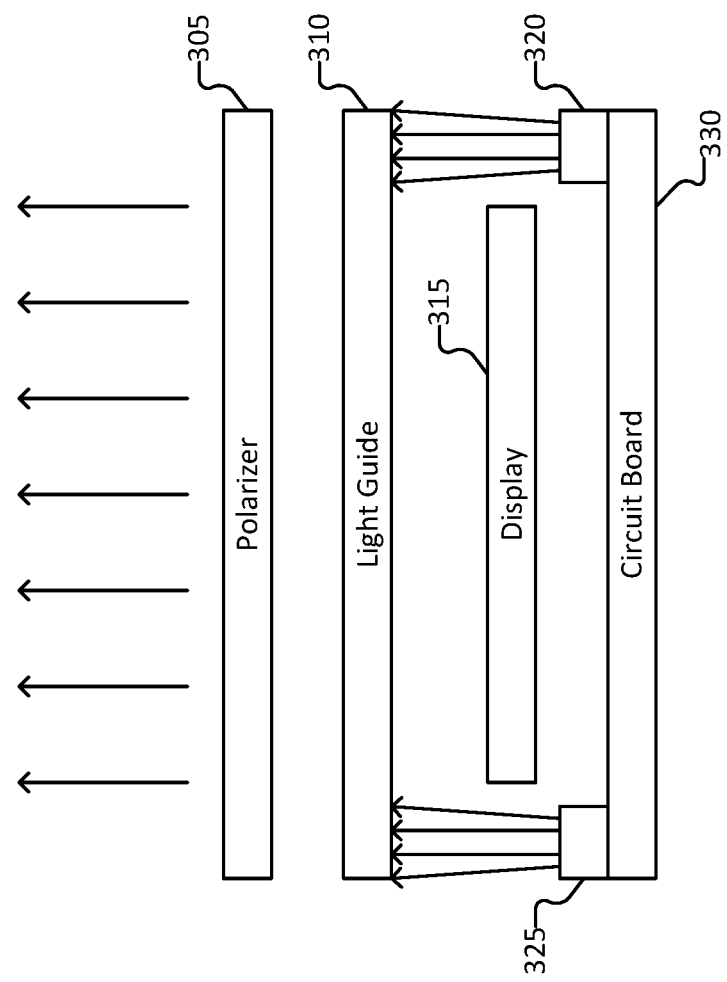
FIG. 3A is a diagram illustrating a section view of an optical unit according to various embodiments of the present application.

FIG. 3A is a diagram illustrating a section view of an optical unit according to various embodiments of the present application. In some embodiments, optical unit 300 is implemented by wearable e-reader 100 and/or system 200.

Optical unit 300 comprises polarizer 305, light guide 310, display 315, light source(s) 320 and/or 325, and circuit board 330. In various embodiments, polarizer 305 comprises a circular polarizer or a linear polarizer. In some embodiments, polarizer 305 is omitted. In some embodiments, polarizer 305 is attached or a part of another optical component (e.g., a lens or window component of the system).

In some embodiments, polarizer 305 is disposed closest to the user's eye and is configured to polarize light reflecting from display 315 (and being transmitted through light guide 310). For example, polarizer 305 polarizes light reflected from an e-ink screen (e.g., display 315) before entering a lens such as a pancake lens.

In some embodiments, light guide 310 is configured to guide incoming light (e.g., from light source(s) 320 and/or 325) to display 315 (e.g., to a top surface of display 315). Light guide 310 is further configured to transmit light reflected from display 315 to polarizer 305. Light guide 310 enables front lighting of an e-ink screen, such as display 315. For example, light guide 310 reflects light emitted by light source(s) 320 and/or 325 based on a reflective coating or angled surface disposed on light guide 310.

In some embodiments, display 315 is disposed on a side of light guide 310 opposite to a side on which polarizer 305 is disposed. Display 315 is controlled to display content. In some embodiments, display 315 is connected to circuit board 330. For example, a control system on circuit board 330 can control display 315 (e.g., driving the display and/or content to be displayed on display 315).

In some embodiments, light source(s) 320 and/or 325 are controlled to emit light that is directed to light guide 310 to be used to provide light to display 315. Light source(s) 320 and/or 325 can be controlled based on a determination of an extent of ambient/external light and/or a determination to operate the system (e.g., the e-reader). In some embodiments, light source(s) 320 and/or 325 are mounted (e.g., bonded via adhesive, etc.) to circuit board 330. Various light technologies can be implemented. In some embodiments, light source(s) 320 and/or 325 comprise an LED (or an LED array).

Figure 3B:
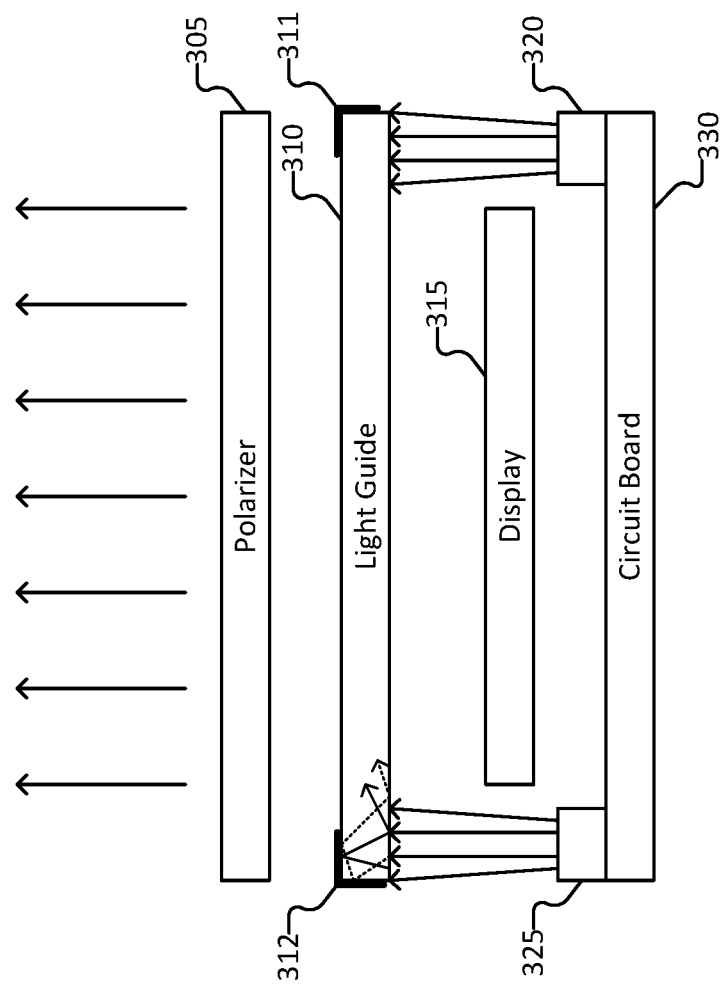
FIG. 3B is a diagram illustrating a section view of an optical unit according to various embodiments of the present application.

FIG. 3B is a diagram illustrating a section view of an optical unit according to various embodiments of the present application. In some embodiments, optical unit 350 is implemented by wearable e-reader 100 and/or system 200.

Further to the example illustrated in FIG. 3B, optical unit 350 comprises reflective coatings or surfaces 311 and 312. Reflective coatings or surfaces 311 and 312 are disposed to reflect incident light from light source(s) 320 and/or 325 to display 315. In some embodiments, reflective coatings or surfaces 311 and 312 are disposed on top edges/corners of light guide 310. As an example, reflective coatings or surfaces 311 and 312 comprise mirrors.

Figure 3C:
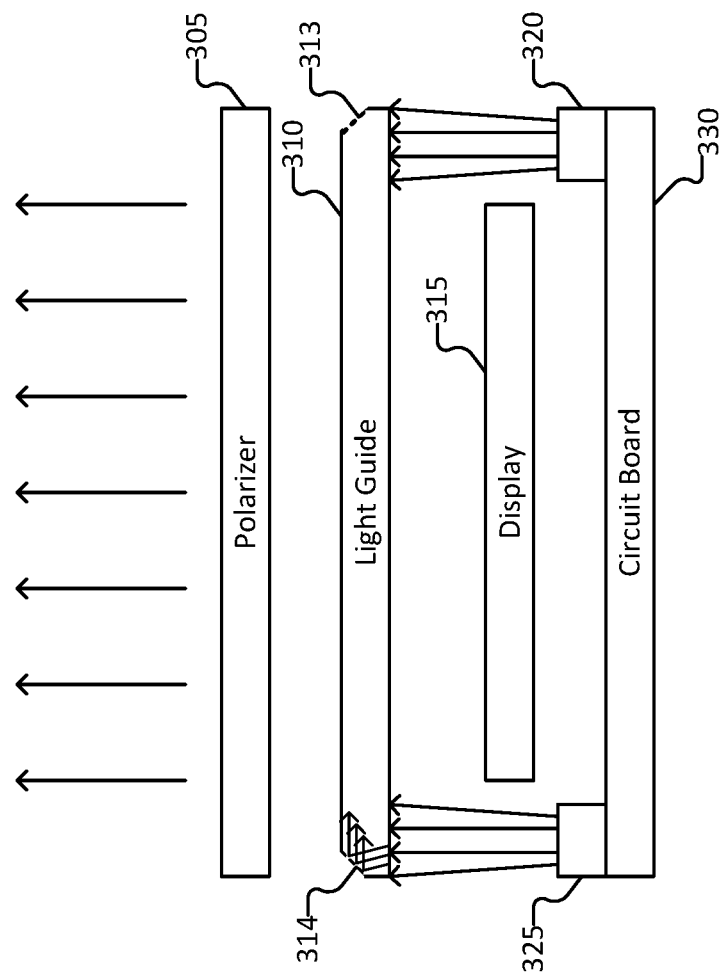
FIG. 3C is a diagram illustrating a section view of an optical unit according to various embodiments of the present application.

FIG. 3C is a diagram illustrating a section view of an optical unit according to various embodiments of the present application. In some embodiments, optical unit 375 is implemented by wearable e-reader 100 and/or system 200.

Further to the example illustrated in FIG. 3A, optical unit 375 comprises angled surfaces 313 and 314. For example, corner edges of light guide 310 are milled to create angled surfaces 313 and 314. The angle at which the angled surfaces 313 and 314 are configured may be based on a relative location of the light source(s) 320 and/or 325 and/or a relative location of display 315. For example, the angle corresponds to an angle at which incident light form light source(s) 320 and/or 325 is reflected to display 315.

In some embodiments, reflective coatings or surfaces are applied to angled surfaces 313 and 314. For example, a mirror can be adhered to angled surfaces 313 and 314 to reflect light to display 315.

Figure 3D:
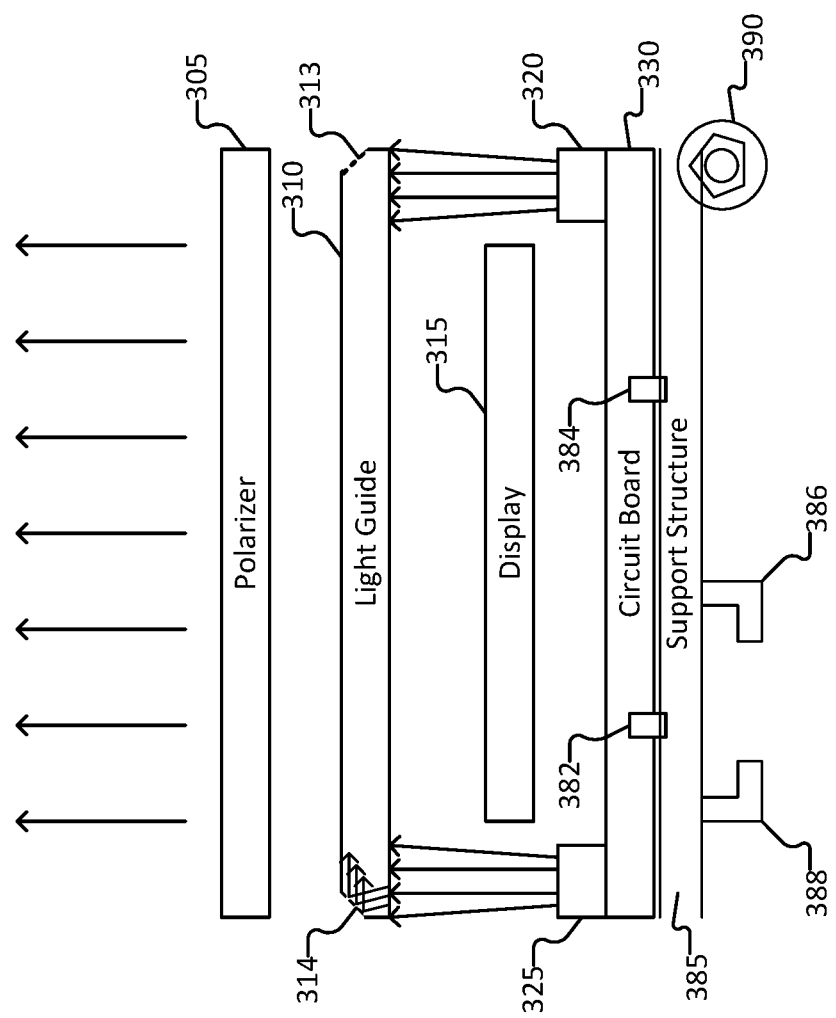
FIG. 3D is a diagram illustrating a section view of an optical unit according to various embodiments of the present application.

FIG. 3D is a diagram illustrating a section view of an optical unit according to various embodiments of the present application. In some embodiments, optical unit 380 is implemented by wearable e-reader 100 and/or system 200.

Further to the example illustrated in FIG. 3C, optical unit 380 has support structure 385 to which circuit board 330 (or the optical unit 380) is mounted.

In some embodiments, reflective coatings or surfaces are applied to angled surfaces 313 and 314. For example, a mirror can be adhered to angled surfaces 313 and 314 to reflect light to travel in light guide 310 to illuminate display 315.

In some embodiments, support structure 385 comprises support elements 382 and 384 that mounts circuit board 330 to support structure 385. In some embodiments, circuit board 330 is adhered to support structure 385 using an adhesive. Support structure comprises rails or tracks 386 and/or 388, and adjustment mechanism 390 (e.g., a knob) to adjust position the support structure along the rails or tracks 386 and/or 388. For example, rails or tracks 386 and/or 388 guide the interpupillary linear adjustment motion using the adjustment mechanism 390. In some embodiments, adjustment mechanism 390 includes a threaded rod and a tapped mount attached to support structure 385 that enables positioning of support structure 385 (and the attached display 315 and/or optical unit 380).

Figure 4:
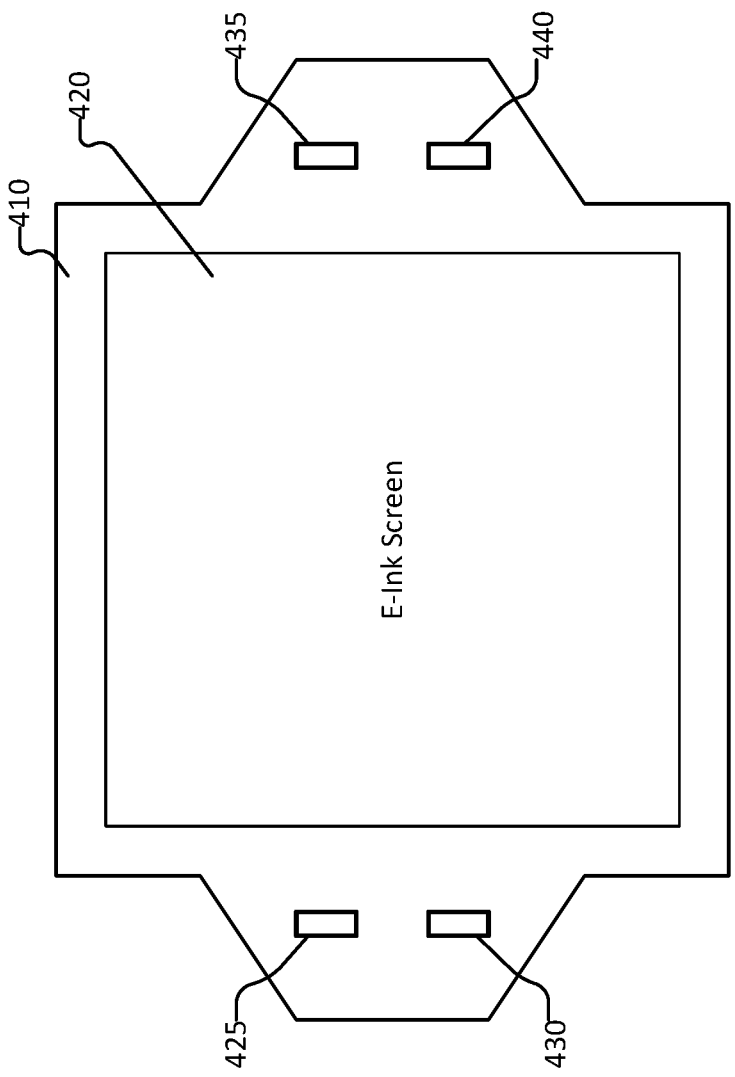
FIG. 4 is a diagram illustrating a section view of a display of a wearable e-reader according to various embodiments of the present application.

FIG. 4 is a diagram illustrating a section view of a display of a wearable e-reader according to various embodiments of the present application. In some embodiments, wearable e-reader 400 is implemented at least in part by wearable e-reader 100 and/or system 200.

Wearable e-reader comprises a circuit board 410 (e.g., a PCB), an e-ink screen 420 connected to circuit board 410, and one or more light sources 425, 430, 435, and/or 440. Circuit board 410 controls e-ink screen 420. In the example illustrated, one or more light sources 425, 430, 435, and/or 440 are top mounted on circuit board 410. In some embodiments, one or more light sources 425, 430, 435, and/or 440 comprise LEDs.

Figure 5:
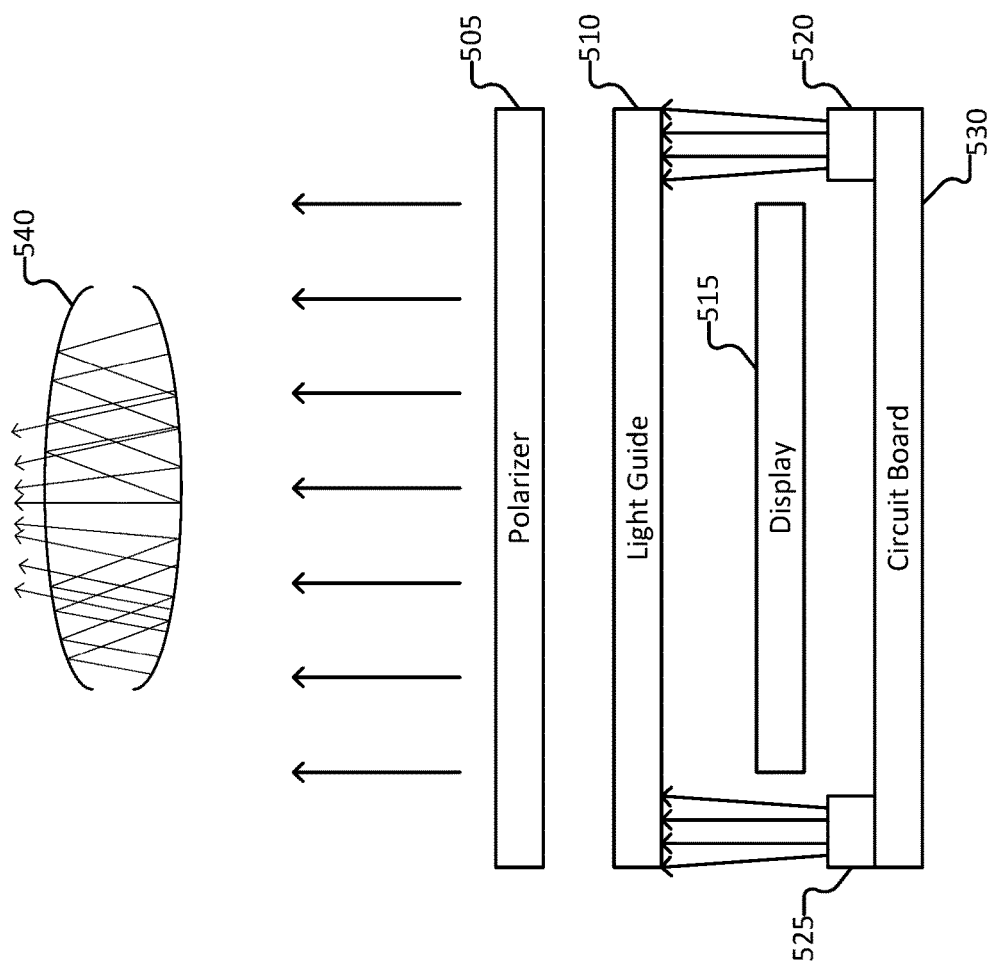
FIG. 5 is a diagram illustrating a section view of a wearable e-reader according to various embodiments of the present application.

FIG. 5 is a diagram illustrating a section view of a wearable e-reader according to various embodiments of the present application. In some embodiments, wearable e-reader 500 is implemented at least in part by wearable e-reader 100 and/or system 200.

Wearable e-reader 500 comprises circular polarizer 505, light guide 510, display 515, light sources 520 and/or 525, circuit board 530, and pancake lens 540. In some embodiments, circular polarizer 505, light guide 510, display 515, light sources 520 and/or 525, circuit board 530 respectively correspond to circular polarizer 305, light guide 310, display 315, light source(s) 320 and/or 325, and circuit board 330 of optical unit 300 of FIG. 3A.

According to various embodiments, pancake lens 540 optically processes light incident from circular polarizer 505 and that is reflected from display 515. For example, pancake lens 540 optically processes the light before such the light enters a user's eye.

Figure 6:
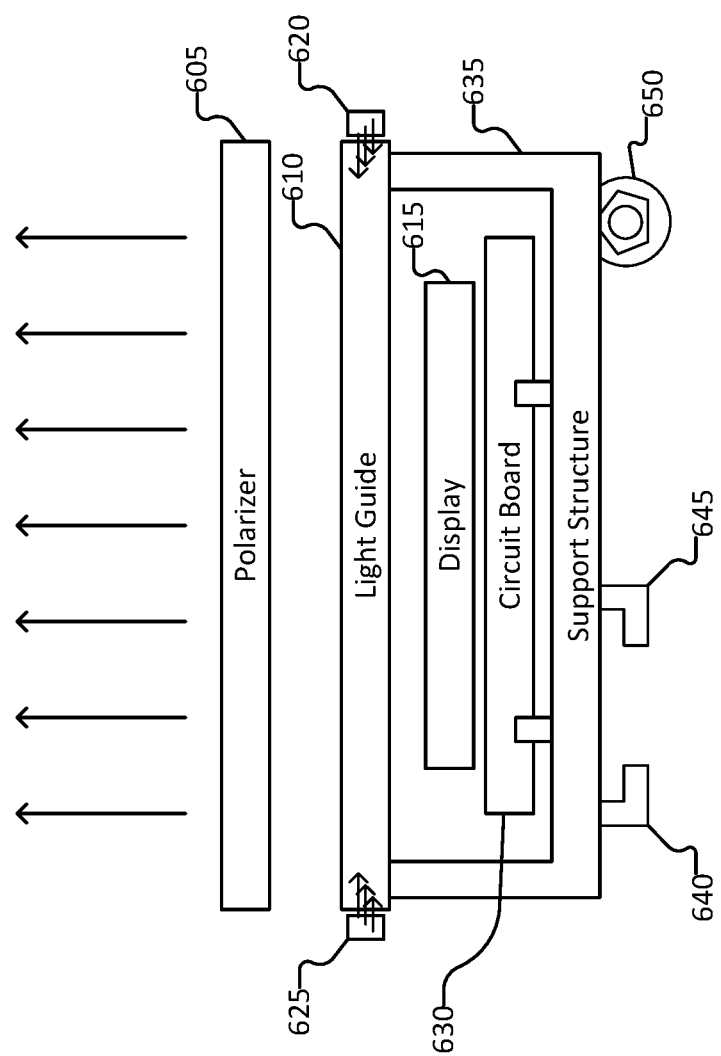
FIG. 6 is a diagram illustrating a section view of a wearable e-reader according to various embodiments of the present application.

FIG. 6 is a diagram illustrating a section view of a wearable e-reader according to various embodiments of the present application. In some embodiments, wearable e-reader 600 is implemented at least in part by wearable e-reader 100 and/or system 200.

Wearable e-reader 600 comprises circular polarizer 605, light guide 610, display 615, light sources 620 and/or 625, and circuit board 630. In some embodiments, 605, light guide 610, display 615, and circuit board 630 respectively correspond to circular polarizer 305, light guide 310, display 315, and circuit board 330 of optical unit 300 of FIG. 3A.

In the example illustrated, light sources 620 and/or 625 are mounted (e.g., bonded or adhered) to sides of light guide 610 to provide side-injected light, which light guide 610 is configured to direct to be incident on display 615.

In some embodiments, support structure 635 provides support for circuit board 630 and/or light guide 610. For example, support structure 635 can comprise support elements that mounts circuit board 630 to support structure 635.

In some embodiments, circuit board 330 is adhered to support structure 385 using an adhesive. Support structure 635 comprises rails or tracks 640 and/or 645, and adjustment mechanism 650 (e.g., a knob) to adjust position the support structure along the rails or tracks 640 and/or 645. For example, rails or tracks 640 and/or 645 guide the interpupillary linear adjustment motion using the adjustment mechanism 650.

In the example shown, support structure 635 extends to provide direct support to light guide 610. For example, light guide 610 can be mounted or otherwise adhered (e.g., using an adhesive) to support structure 635.

Figure 7:
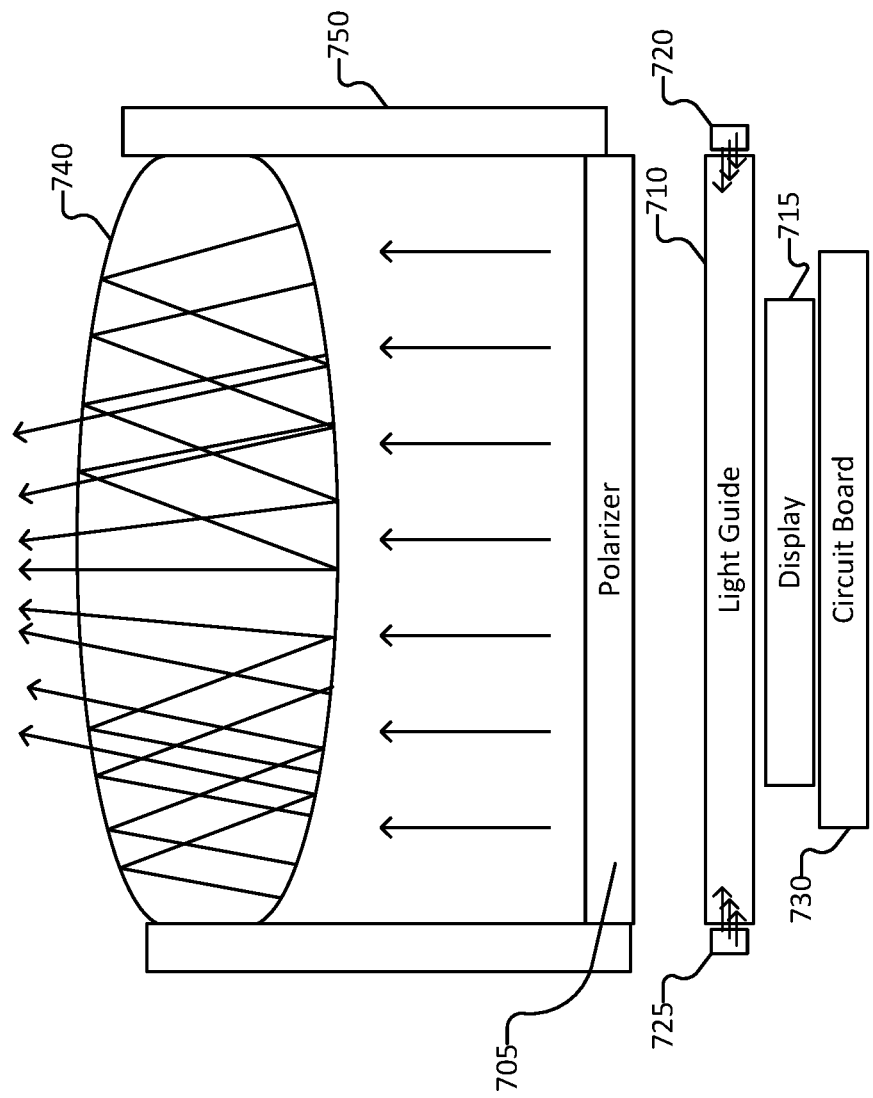
FIG. 7 is a diagram illustrating a section view of a wearable e-reader according to various embodiments of the present application.

FIG. 7 is a diagram illustrating a section view of a wearable e-reader according to various embodiments of the present application. In some embodiments, wearable e-reader 700 is implemented at least in part by wearable e-reader 100 and/or system 200.

Wearable e-reader 700 comprises polarizer 705, light guide 710, display 715, light sources 720 and/or 725, and circuit board 730. In some embodiments, 705, light guide 710, display 715, and circuit board 730 respectively correspond to circular polarizer 305, light guide 310, display 315, and circuit board 330 of optical unit 300 of FIG. 3A.

In the example illustrated, light sources 720 and/or 725 are mounted (e.g., bonded or adhered) to sides of light guide 710 to provide side-injected light, which light guide 710 is configured to be incident on display 715.

As shown in FIG. 7, in some embodiments, polarizer 705 is connected to pancake lens 740 such as by support structure 750. In some embodiments, pancake lens 740 and polarizer 705 are integrated into a single unit. In some embodiments, polarizer 705 is adhered (e.g., using an index-matching adhesive) to a bottom of pancake lens 740.

Figure 8:
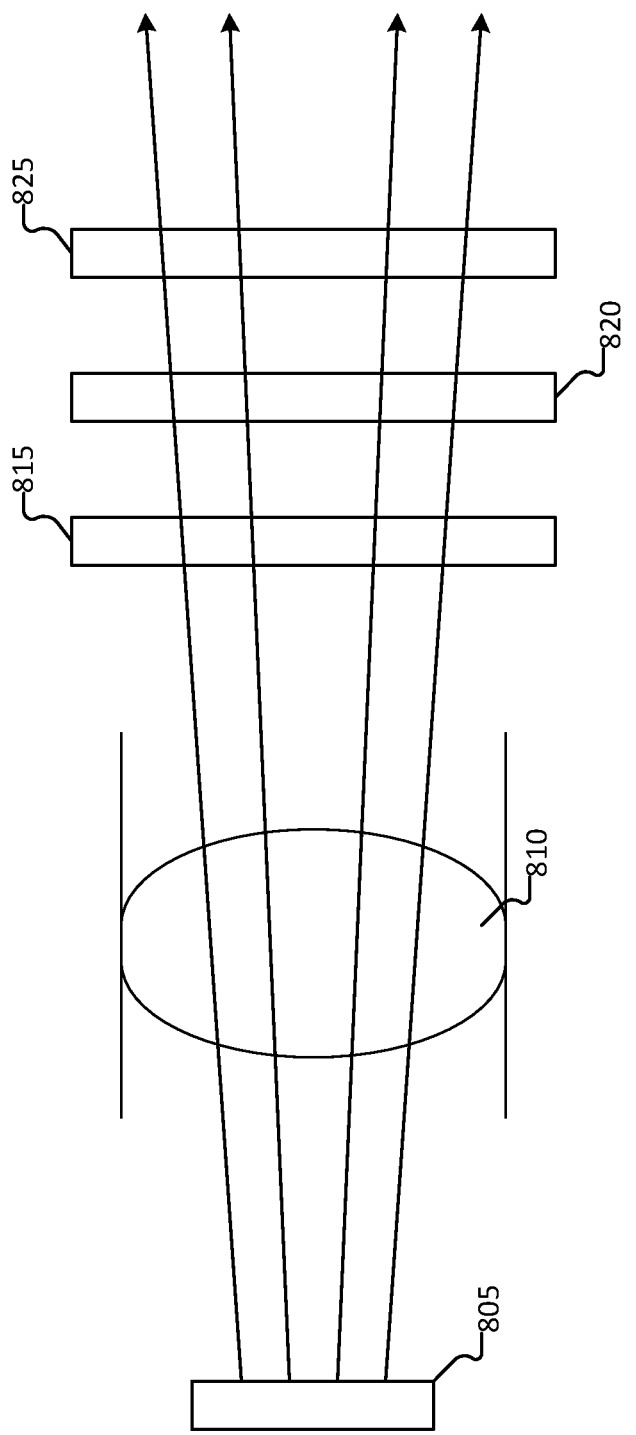
FIG. 8 is a diagram illustrating a section view of a wearable e-reader according to various embodiments of the present application.

FIG. 8 is a diagram illustrating a section view of a wearable e-reader according to various embodiments of the present application. In some embodiments, wearable e-reader 800 is implemented at least in part by wearable e-reader 100 and/or system 200.

According to various embodiments, wearable e-reader 800 is a backlight e-reader. For example, a user views content on the display (e.g., LCD 815) through view point 805. Light is emitted by backlight 820 (e.g., an LED) based on control from a controls system on circuit board 825 (e.g., a PCB). The light emitted by backlight 820 is directed through a back of LCD 815, and viewable content corresponding to light passing through LCD is directed back through a unit 810 comprising a pancake lens a polarizer.

Figure 9:
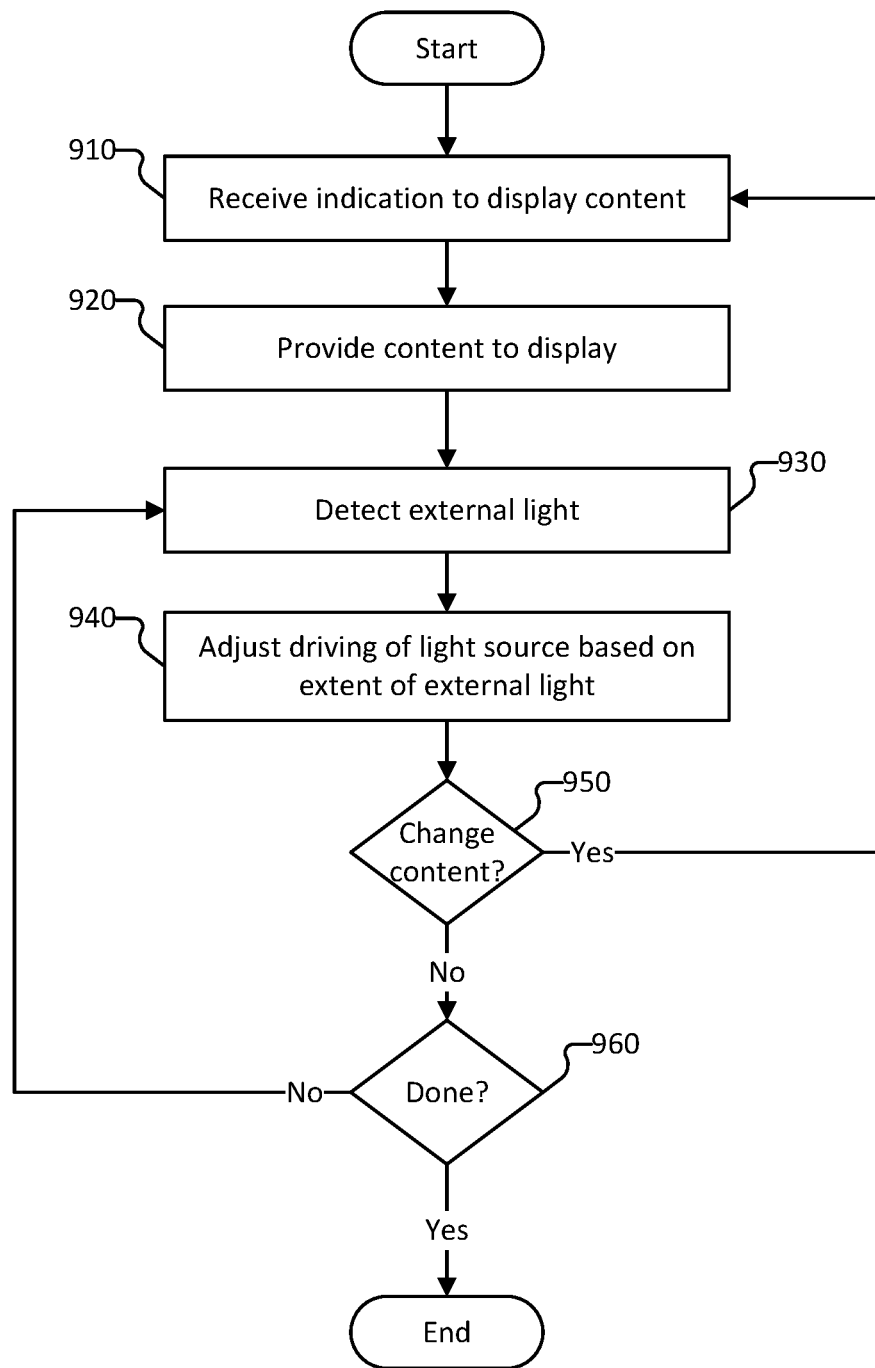
FIG. 9 is a diagram illustrating a method for controlling a wearable e-reader according to various embodiments of the present application.

FIG. 9 is a diagram illustrating a method for controlling a wearable e-reader according to various embodiments of the present application. According to various embodiments, process 900 is implemented at least in part by wearable e-reader 100 of FIG. 1, optical unit 300 of FIG. 3A, optical unit 350 of FIG. 3B, optical unit 375 of FIG. 3C, and optical unit 380 of FIG. 3D.

At 910, an indication to display content is received. In some embodiments, the system receives the indication to display content based on a user input or a detected interaction. For example, the indication to display content is received based on a user input to a peripheral device to which the system is connected (e.g., a hand-held wand, a smartphone, etc.) or a user input to one or more buttons on the wearable e-reader. In some embodiments, the indication to display content is received based on a determination that the arms for the wearable e-reader are moved to an open position (e.g., an extended position that allows a user to wear the wearable e-reader), or in response to a determination that the wearable e-reader is currently being worn by a user (e.g., based on a sensor that detects the user's face or ears in relation to a location of the frame of the wearable e-reader).

At 920, content to be displayed is provided. In some embodiments, the system obtains the content from storage (e.g., a memory of the system) and provides the content to a display of the system. In some embodiments, the system performs a pre-processing with respect to the content before providing the content to the display.

At 930, external light is detected. In some embodiments, the system uses one or more sensors, such as an ambient light sensor, and the system obtains information pertaining to external light from the one or more sensors.

At 940, a driving of a light source is adjusted based at least in part on an extent of the external light.

At 950, a determination is made as to whether the content (e.g., the content being displayed) is to be changed. In some embodiments, the system determines whether to change the content based on a user input or user action (e.g., an action detected by a sensor(s) of the system).

In response to a determination that the content is to be changed at 950, process 900 returns to 910 and process 900 iterates over 910-950 until a determination that the content is not to be changed.

In response to determination that the content is to not be changed at 950, process 900 proceeds to 960.

At 960, a determination is made as to whether process 900 is complete. In some embodiments, process 900 is determined to be complete in response to a determination that no further content is to be displayed, an input to turn off the system is received, the system detects that the user removes (e.g., takes off) wearable e-reader, etc. In response to a determination that process 900 is complete, process 900 ends. In response to a determination that process 900 is not complete, process 900 returns to 910.

Figure 10:
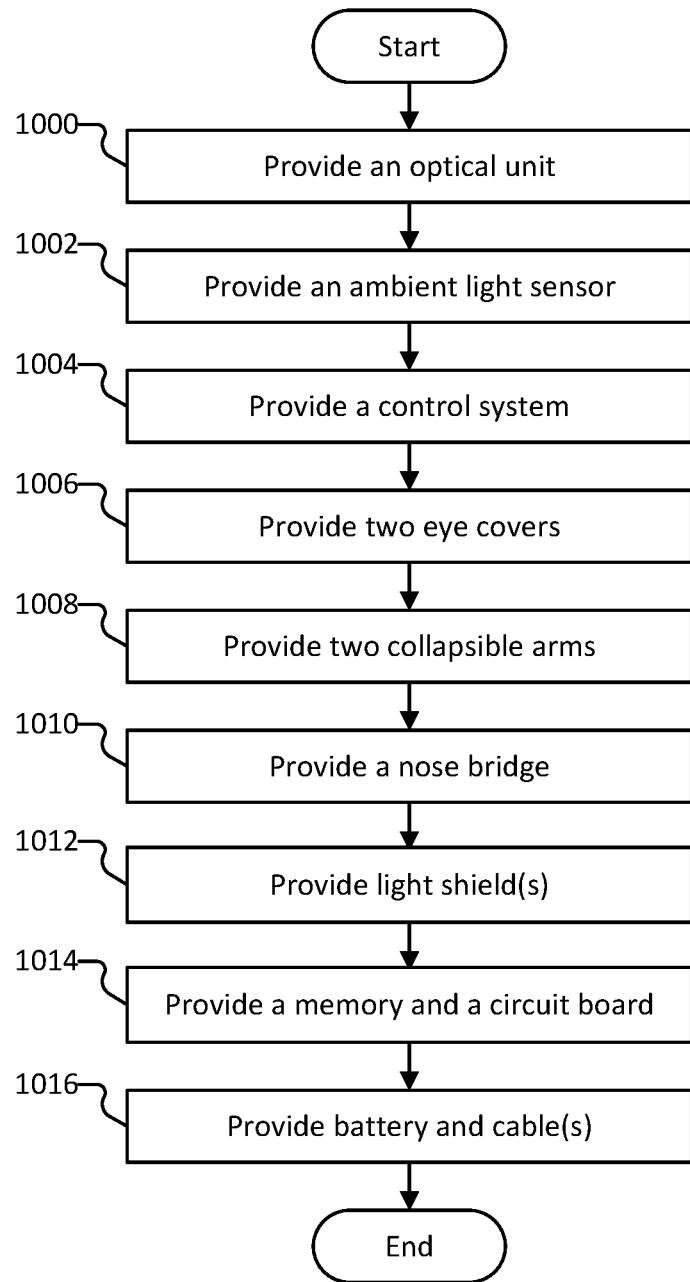
FIG. 10 is a flow diagram illustrating an embodiment of a process for a wearable e-reader.

FIG. 10 is a flow diagram illustrating an embodiment of a process for a wearable e-reader. In the example shown, in 1000 an optical unit is provided. For example, an optical unit that is wearable is provided. In various embodiments, the optical unit comprises one or more of the following: a magnifying lens, a polarizer, a front light, and/or a display. In some embodiments, a front light illuminates a display from the front of the display to be observable by a user via the magnifying lens. In some embodiments, the magnifying lens comprises a pancake magnifying lens. In some embodiments, the display comprises an electronic ink (e-ink) display. In some embodiments, the display comprises a liquid crystal display (LCD). In some embodiments, the optical unit comprises a polarizer (e.g., a circular polarizer). In some embodiments, the optical unit comprises one of two optical units in the system, and both of the two optical units are wearable. In some embodiments, the front light comprises at least one light emitting diode (LED). In some embodiments, the optical unit comprises a light guide, and the display is front lit based at least in part on the light guide. In some embodiments, the light guide receives light from at least one LED. In various embodiments, the light guide comprises a rectangular volume, a circular volume (e.g., any shape with a circular shape from one view point—for example, sides can be angled, rounded, or any other profile), cylindrical volume, or any other appropriate light guide shape. In some embodiments, the light guide comprises a plastic (e.g., a clear acrylic, polycarbonate, etc.). In 1002, an ambient light sensor is provided. In some embodiments, a control system is configured to adjust an amount of light injected to the display based at least in part on an amount of ambient light detected by the ambient light sensor. In 1004, a control system is provided. For example, a control system controls an amount of light to a front light a display. In 1006, two eye covers are provided. For example, two eye covers that are mounted on a glasses frame. In 1008, two collapsible arms are provided. For example, two collapsible arms are attached via hinges as part of a glasses frame. In 1010, a nose bridge is provided. For example, a nose bridge is part of a glasses frame between support portions of the glasses frame that mount two eye covers or that is used to connect two eye covers of the glasses frame. In some embodiments, the two collapsible arms extend a length to fit over ears of a user for wearing as glasses. In some embodiments, each of the two collapsible arms comprise a battery that powers at least the front light. In 1012, light shield(s) is/are provided. For example, one or more light shields is/are provided to prevent external light from entering a viewing area. In 1014, a memory and a circuit board are provided. For example, a memory is configured to store content and a circuit board comprises a processor configured to control the optical unit to display the content. In 1016, battery and cable(s) are provided. For example, one or more batteries that power at least one processor and the front light and a plurality of flex cables that connect (i) the one or more batteries, (ii) the front light, and (iii) the circuit board.

Figure 11:
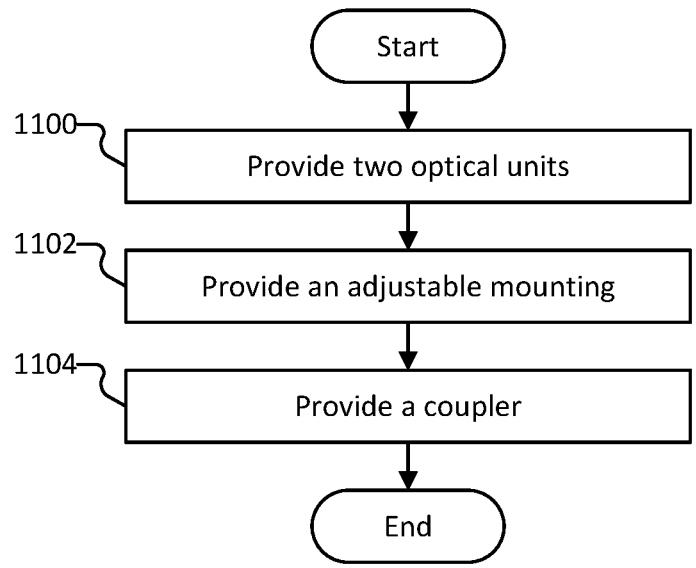
FIG. 11 is a flow diagram illustrating an embodiment of a process for a wearable e-reader.

FIG. 11 is a flow diagram illustrating an embodiment of a process for a wearable e-reader. In the example shown, in 1100 two optical units are provided. For example, the two optical units are part of the wearable e-reader system. The wearable e-reader system includes a front lit display (e.g., an e-ink display). In 1102, an adjustable mounting is provided. For example, an adjustable mounting is built into the wearable e-reader system that enables a user to adjust a mounting position of the two optical units with respect to the position, when being worn, of the wearable e-reader. For example, an adjustment can be made of the interpupillary distance between the two optical units to increase or decrease the distance from the nose of a glasses frame of each of the optical units. In various embodiments, a symmetry adjustment of the two optical units with respect to the nose is adjustable, a height adjustment of the two optical units with respect to the nose or cheeks is adjustable, an angle of the normal of the plane of the displays towards or away from the nose, and/or any other appropriate adjustment for a wearable e-reader is/are provided.

In some embodiments, the adjustable mounting comprises a threaded rod. In some embodiments, the threaded rod is coupled to an optical unit of the two optical units with a tapped optical unit mount. In some embodiments, the threaded rod comprises a left-handed rod, a right-handed rod, or a left-handed rod and a right-handed rod. For example, the rod is threaded so that when a center knob that is coupled to the rod is rotated in one direction that a left optical unit moves right and the right optical unit moves left and when the center knob that is coupled to the rod is rotated in the other direction that the left optical unit moves left and the right optical unit moves right. In other words, the knob enables a user to adjust the position of the optical units to increase and decrease the interpupillary distance. In some embodiments, the threaded rod that couples the knob to the tapped mounting points of the optical units on the threaded rod has oppositely threaded regions on opposite sides (e.g., left-handed threads on the left side and right-handed threads on the right side or vice versa). In some embodiments, the adjustable mounting comprises a knob, in some embodiments, the knob is couple to the threaded rod. In some embodiments, the knob enables rotating the threaded rod. In various embodiments, the threaded rod adjusts a position of one optical unit of the two optical units, the threaded rod adjusts a position of both of the optical units, or any other appropriate combination of adjustments.

In some embodiments, the adjustable mounting comprises gear racks and pinion. For example, two racks opposing each other with a gear in between such that turning the gear causes the racks to go outward or inward together. In some embodiments, the adjustable mounting comprises magnetic snaps. For example, the lenses slide along a track of magnets such that they snap in place every millimeter or so.

In 1104, a coupler is provided. For example, a coupler couples a glasses frame (e.g., on the nose bridge—between the two optical units) to a mounting for a knob. In some embodiments, the coupler includes a set screw for adjusting position of the two optical units either up and down or left and right with respect to the glasses frame or relative to a nose bridge of the glasses frame. In some embodiments, the coupler includes two set screw for adjusting position of the two optical units one set screw for up and down and one set screw for left and right with respect to the glasses frame or relative to a nose bridge of the glasses frame. In some embodiments, adjusting the position up or down or left or right of the two optical units relative to the nose bridge of the glasses frame is guided by a rail or a groove or a dovetail slide. In some embodiments, adjusting the position up or down of both of the two optical units together relative to the nose bridge of the glasses frame is guided by a first rail or a first groove or a first dovetail slide, and wherein the second set screw of the two set screws adjusts the position left or right of both of the two optical units together relative to the nose bridge of the glasses frame is guided by a second rail or a second groove or a second dovetail slide, wherein the second rail or the second groove or the second dovetail slide are at right angles to the first rail or the first groove or the first dovetail slide.

Figure 12A:
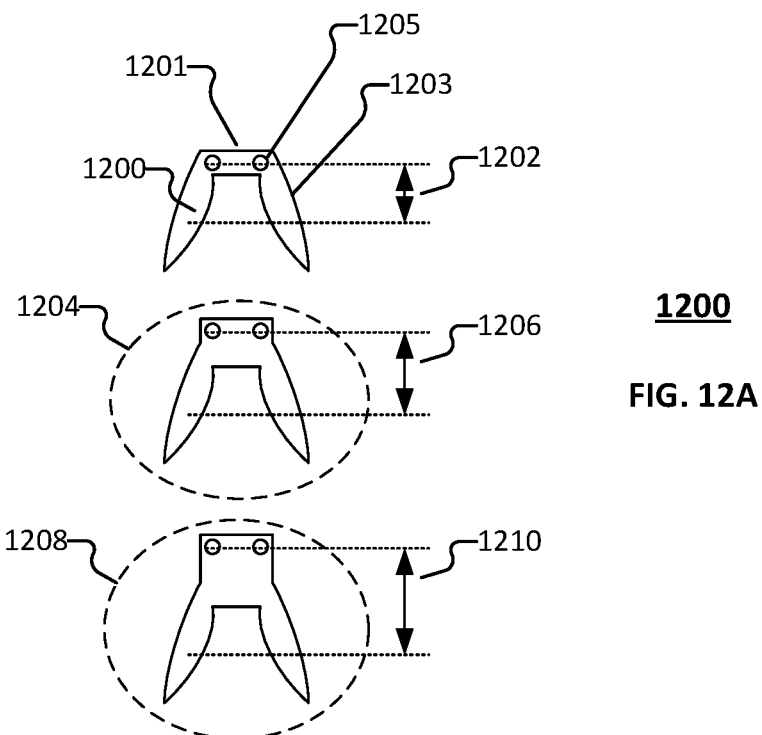
FIG. 12A is a diagram illustrating an embodiment of a height adjustment using changeable nose pieces for the wearable e-reader.

FIG. 12A is a diagram illustrating an embodiment of a height adjustment using changeable nose pieces for the wearable e-reader. In the example shown, a first nose piece comprises left pad 1200, right pad 1203, connector 1201, and two mounting holes (e.g., mounting hole 1205). The first nose piece has height distance 1202 between center of left pad 1200 and right pad 1203 and the two mounting holes. Second nose piece 1204 comprises a left pad, a right pad, a connector, and two mounting holes. Second nose piece 1204 has height distance 1206 between center of the left pad and the right pad and the two mounting holes. Third nose piece 1208 comprises a left pad, a right pad, a connector, and two mounting holes. Third nose piece 1208 has height distance 1210 between center of the left pad and the right pad and the two mounting holes.

Figure 12B:
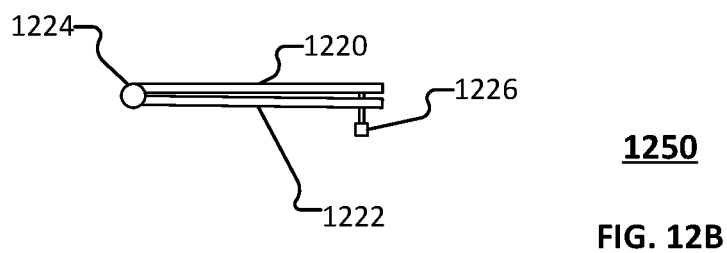
FIG. 12B is a diagram illustrating an embodiment of a tilt adjuster for displays using set screws for a wearable e-reader.

FIG. 12B is a diagram illustrating an embodiment of a tilt adjuster for displays using set screws for a wearable e-reader. In the example shown, plate 1220 and plate 1222 that are attached to hinge 1224. Hinge 1224 enables an angle offset between plate 1220 and plate 1222. The angle can be adjusted using screw 1226. In some embodiments, one plate is attached to an optical display and the other plate is attached to the adjustable mount to enable angling displays to the eyes.

Figure 13:
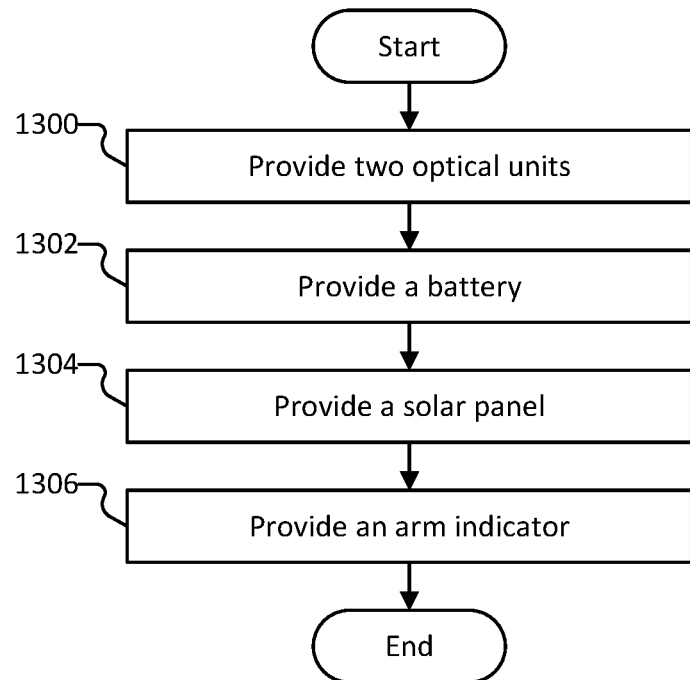
FIG. 13 is a flow diagram illustrating an embodiment of a process for powering a wearable e-reader.

FIG. 13 is a flow diagram illustrating an embodiment of a process for powering a wearable e-reader. In the example shown, in 1300 two optical units are provided. For example, the two optical units are part of the system that is wearable. In some embodiments, the optical units include a display that is front lit (e.g., an e-ink display). In 1302, a battery is provided. For example, one or more batteries provide power to the two optical units including the display and the front light. In some embodiments, the one or more batteries is/are mounted in one or more of the collapsible arms of the glasses frame. In some embodiments the one or more batteries is/are removable from the one or more collapsible arms (e.g., one battery in one collapsible arm, two batteries in each of the two collapsible arms, etc.). In some embodiments, the battery is electrically connected to at least one of the two optical units. In some embodiments, the optical unit or each of the two optical units includes a circuit board to drive a display in the optical unit. In 1304, a solar panel is provided. For example, one or more solar panels are mounted on a glasses frame (e.g., mounted in place of lenses as eye covers in the front of the glasses frame, mounted in the side arms of glasses frame, etc.). In some embodiments, the one or more solar panels is electrically coupled to a circuit board, where the circuit board has a battery charging circuit. In some embodiments, the circuit board is electrically coupled to the battery. In some embodiments, the one or more solar panels is/are used to charge the one or more batteries using a charging circuit on the circuit board. In 1306, an arm indicator is provided. For example, an arm indicator indicates whether a glasses arm is collapsed or open on the glasses frame. In some embodiments, the arm indicator comprises a switch that is open when the arm is collapsed and closed when the arm is open. In some embodiments, the battery is enabled to power the front lit display of the two optical units in response to the arm being open. In some embodiments, the battery is not enabled to power the front lit display of the two optical units in response to the arm being collapsed. In some embodiments, the battery is not enabled to power the front lit display of the two optical units after a predetermined delay to the arm being collapsed. In some embodiments, the battery not enabling powering the front lit display of the two optical units after the predetermined delay to the arm being collapsed uses a delay circuit on a circuit board.

Figure 14:
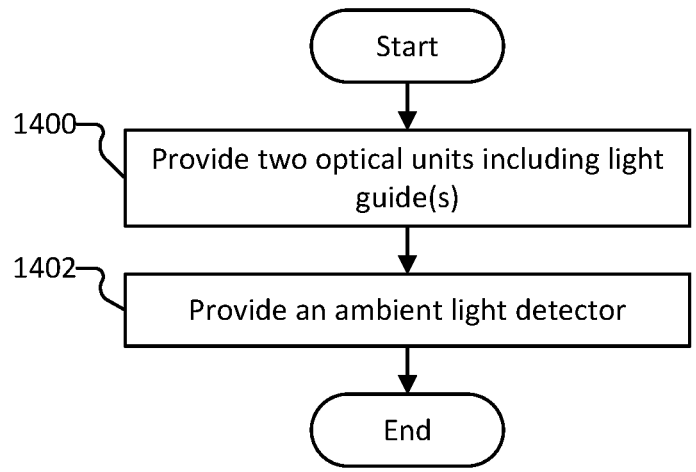
FIG. 14 is a flow diagram illustrating an embodiment of a process for front lighting of a display for a wearable e-reader.

FIG. 14 is a flow diagram illustrating an embodiment of a process for front lighting of a display for a wearable e-reader. In the example shown, in 1400 two optical units including light guide(s) are provided. For example, a wearable e-reader system includes two optical units that are wearable (e.g., mounted on a glasses frame), where the optical units include a front lit display and a light emitting diode (LED), where the LED is used to front light the front lit display. In some embodiments, the optical unit includes a light guide, and the display is front lit based at least in part on the light guide—for example, the light guide is used to guide light from a light source (e.g., an LED) to a display (e.g., a front lit e-ink display). In various embodiments, the light from an LED is injected into a side of the light guide, into a bottom of the light guide, or injected in any other appropriate manner. In some embodiments, the wearable e-reader comprises a circuit board. In some embodiments, an LED is mounted on the circuit board or is electrically connected to the circuit board using a connector (e.g., a flex connector). In some embodiments, the light guide comprises a window on top of the display (e.g., a transparent slab of material that is able to guide light). In some embodiments, the light guide comprises a reflection surface on a surface of the light guide, and light from the LED is directed at least partially towards the reflection surface and the light is reflected to the front lit display. In various embodiments, the reflection surface comprises one or more of the following: a top surface of the light guide, a side surface of the light guide, a top surface and a side surface of the light guide, or any other appropriate part of the light guide. In some embodiments, at least one corner edge of the light guide includes an angle-cut corner edge, and light from the front light is directed at least partially towards the angle-cut corner edge, and the light is reflected to the front lit display. In some embodiments, the angle-cut corner edge comprises a reflection surface. In some embodiments, the angle-cut corner edge is one of a plurality of angle-cut corner edges. In some embodiments, the plurality of angle-cut corner edges comprises reflection surfaces. In various embodiments, the light guide comprises polycarbonate, clear acrylic, glass, quartz, or any other appropriate transparent material. In some embodiments, the light guide includes a polarizer—for example, a polarizer is coated on a surface of the light guide, is bonded to the light guide, is placed adjacent to the light guide, etc. In 1402, an ambient light detector is provided. For example, a light detector is coupled to a glasses frame to detect ambient light levels around the glasses. In some embodiments, the LED light level is injected into the light guide based on a signal level from the ambient light detector. For example, a circuit on a circuit board receives a light level measurement from an ambient light detector and this is used to determine a light level for the LED to inject into a light guide for front lighting a display. In some embodiments, the brighter the ambient light the brighter LED light is injected into the light guide for front lighting the display. In some embodiments, the dimmer the ambient light the dimmer LED light is injected into the light guide for front lighting the display.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   two optical units, wherein the two optical units are part of the system that is wearable, and wherein the optical units comprise a front lit display;
   a battery, wherein the battery powers the two optical units; and
   an arm indicator, wherein the arm indicator indicates whether the arm is collapsed or open, wherein the battery is not enabled to power the front lit display of the two optical units after a predetermined delay to the arm being collapsed.

2. The system of claim 1, wherein the battery is mounted in a collapsible arm.

3. The system of claim 2, wherein the battery is removable from the collapsible arm.

4. The system of claim 1, wherein the battery is one of two batteries.

5. The system of claim 4, wherein the two batteries are mounted in two collapsible arms.

6. The system of claim 5, wherein the two batteries are removable from the two collapsible arms.

7. The system of claim 1, wherein the battery is electrically connected to at least one of the two optical units.

8. The system of claim 7, wherein the two optical units includes a circuit board to drive a display.

9. The system of claim 1, further comprising a solar panel.

10. The system of claim 9, wherein the solar panel is mounted on a glasses frame.

11. The system of claim 10, wherein the solar panel is mounted on a front side of the glasses frame.

12. The system of claim 1, wherein the solar panel is electrically coupled to a circuit board.

13. The system of claim 12, wherein the circuit board has a battery charging circuit.

14. The system of claim 13, wherein the battery charging circuit is electrically coupled to the battery.

15. The system of claim 1, wherein the battery is enabled to power the front lit display of the two optical units in response to the arm being open.

16. The system of claim 1, wherein the battery is not enabled to power the front lit display of the two optical units in response to the arm being collapsed.

17. The system of claim 1, wherein the battery not enabling powering the front lit display of the two optical units after the predetermined delay to the arm being collapsed uses a delay circuit on a circuit board.

18. A method, comprising:
   providing two optical units, wherein the two optical units are part of the system that is wearable, and wherein the optical units comprise a front lit display; and
   providing a battery, wherein the battery powers the two optical units; and
   providing an arm indicator, wherein the arm indicator indicates whether the arm is collapsed or open, wherein the battery is not enabled to power the front lit display of the two optical units after a predetermined delay to the arm being collapsed.

* * * * *